No. 612,228. Patented Oct. 11, 1898.
S. C. BALL.
NUT LOCK.
(Application filed Nov. 26, 1897.)
(No Model.)
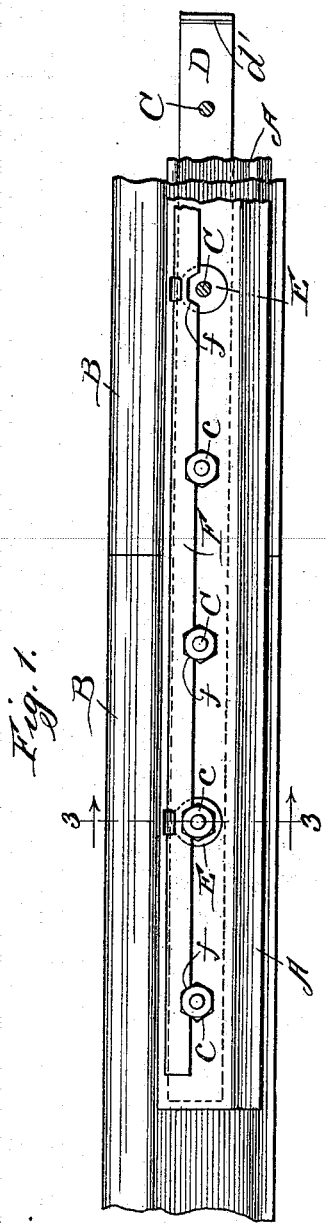
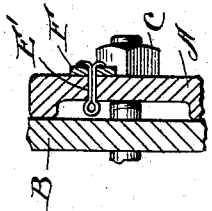
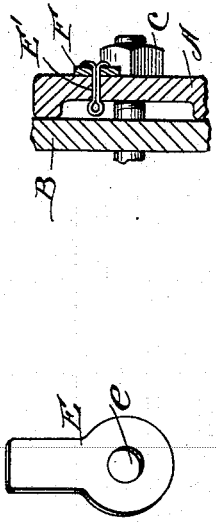
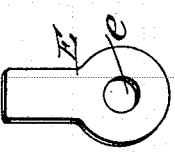
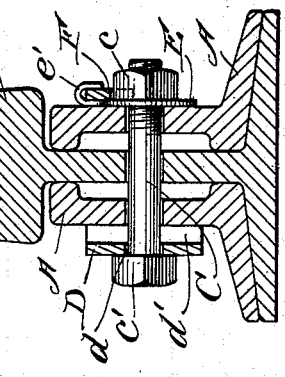
Witnesses
R. J. Jaeker
E. A. Duggan
Inventor:
Samuel C. Ball
By Chas C. Tillman
Atty.
THE NORRIS PETERS CO., PHOTO-LITHO., WASHINGTON, D. C.

UNITED STATES PATENT OFFICE.

SAMUEL C. BALL, OF WEST PULLMAN, ILLINOIS, ASSIGNOR OF TWO-THIRDS TO ERNEST BIHL AND CHARLES E. DAVIS, OF CHICAGO, ILLINOIS.

NUT-LOCK.

SPECIFICATION forming part of Letters Patent No. 612,228, dated October 11, 1898.

Application filed November 26, 1897. Serial No. 659,779. (No model.)

*To all whom it may concern:*

Be it known that I, SAMUEL C. BALL, a citizen of the United States, residing at West Pullman, in the county of Cook and State of Illinois, have invented certain new and useful Improvements in a Combined Nut-Lock and Spring-Holder for Bolts, of which the following is a specification.

This invention relates to an improved device for locking the nuts on screw-bolts and for holding the bolts in such a manner as to compensate for the expansion and contraction thereof, thus avoiding friction and holding the bolts more securely in place, and while it is more especially designed to be used for securing and locking the nuts on the bolts and holding the bolts employed for fastening fish-plates to railway-rails yet it may be employed for nuts and bolts used for various other purposes; and it consists in certain peculiarities of construction, novel arrangement, and operation of the various parts thereof, as will be hereinafter more fully set forth and specifically claimed.

The principal object of my invention is to provide a combined nut-lock and spring-holder for bolts which shall be so constructed as to enable the lock for the nuts to be easily attached or readily removed, yet when in position on the nuts will furnish a positive lock therefor and a spring-holder for the bolts which will firmly secure them and their nuts, with respect to the fish-plates or other pieces through which they pass, in such a manner as to take up or compensate for the expansion and contraction of the bolts.

In order to enable others skilled in the art to which my invention pertains to make and use the same, I will now proceed to describe it, referring to the accompanying drawings, in which—

Figure 1 is a view in side elevation of parts of two railway-rails, showing them secured together and illustrating my nut-lock and spring-holder for the bolts thereon. Fig. 2 is a detached perspective view of a spring-holder for the bolts. Fig. 3 is an enlarged cross-sectional view taken on line 3 3 of Fig. 1, looking in the direction indicated by the arrows and illustrating the spring-holder and nut-lock in position. Fig. 4 is a detached perspective view of one of the fasteners used for securing the locking-bar in position; and Fig. 5 is a cross-sectional view of a portion of one of the fish-plates and a part of a rail, showing a modification in the manner of securing the locking-bar in position.

Similar letters refer to like parts throughout the different views of the drawings.

A represents the fish-plates, which may be of the ordinary or any preferred construction, and are placed, as usual, on each side of the rails B and across the joints thereof. Passing through suitable openings in the fish-plates are a series of bolts C, which are screw-threaded on one of their ends to receive the nuts $c$ and have at their other ends heads or enlargements $c'$, which rest against the surface of the spring holder or plate D, which, as is clearly shown in Fig. 2 of the drawings, is formed with a series of openings $d$ to receive the stems or shanks of the bolts, and, between said openings, is provided with projections $d'$ to rest against the surface of the adjacent fish-plate, thus holding the plate or holder at a distance therefrom, as is clearly shown in Fig. 3 of the drawings. The projections $d'$ on the spring holder or plate D are separate pieces therefrom and are secured thereto by welding or otherwise, which construction renders it possible to construct said spring-holder without special machinery therefor. The bolts C are passed through the openings $d$ in the spring holder or plate D and through the openings therefor in the fish-plates and rails, and when thus placed the heads $c'$ of the bolts will rest against the outer surface of the plate-holder and will be held tightly thereagainst by means of the nuts $c$, located on the screw-threaded ends of the bolts, as is clearly shown in Fig. 3 of the drawings. Between the nuts and one of the fish-plates is located on a number of the bolts a fastener E, which is provided with an opening $e$ for the reception of the bolt and has its upper end made of flexible material, so that it may be bent or formed with a hook $e'$ (see Fig. 3) to engage the locking-bar F, which is provided with a series of recesses $f$, of a form and size to correspond with and fit over the nuts $c$, which may be of any desired shape other than circular.

Instead of using the fasteners E, I may employ fasteners E', which are made of wire and are passed through openings in one of the fish-plates and in the locking-bar F and have their ends divided, as shown in Fig. 5 of the drawings.

In the joint application of myself and Olin A. Clark, Serial No. 657,626, filed November 6, 1897, for improvement in safety nut-locks we have shown and claimed a locking-bar and a fastener therefor similar to the locking-bar F and fasteners E' in my present application; but herein I do not claim said locking-bar and fastening specifically, but in combination with the spring plate or holder.

Having thus fully described my invention, what I claim as new, and desire to secure by Letters Patent, is—

The combination with the fish-plates provided with openings for the reception of a series of bolts, of a spring plate or holder provided with a series of openings and having a number of projections secured to one of its sides and located on one of the fish-plates, the bolts passing through the openings in the spring-holder and fish-plates provided with heads on their ends adjacent to the holder and with screw-threads on the opposite ends, screw-threaded nuts located on the screw-threaded ends of the bolts, a locking-bar having a series of recesses in one of its edges to receive and engage the nuts, the fasteners E located on the bolts between the nuts and one of the fish-plates and having their upper portions flexible and adapted to be formed into hooks to engage the locking-bar, substantially as described.

SAMUEL C. BALL.

Witnesses:
CHAS. C. TILLMAN,
E. A. DUGGAN.